Figure 1:
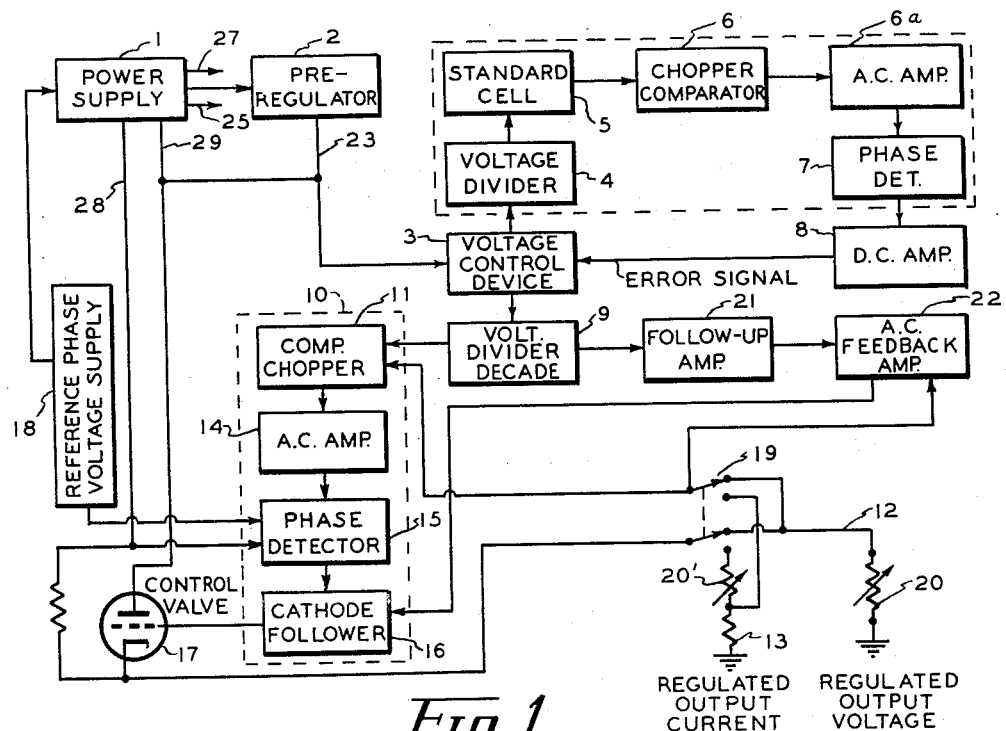

Dec. 9, 1958   J. H. SEARCY   2,864,052
AUTOMATIC REGULATORS
Filed Feb. 1, 1956   2 Sheets-Sheet 1

INVENTOR
JOHN H. SEARCY
BY
ATTORNEY

United States Patent Office 2,864,052
Patented Dec. 9, 1958

2,864,052

AUTOMATIC REGULATORS

John Holden Searcy, Melbourne, Fla., assignor to Radiation, Inc., Melbourne, Fla., a corporation of Florida Application February 1, 1956, Serial No. 562,678

10 Claims. (Cl. 323—4)

The present invention relates generally to automatic regulators and more particularly to systems for regulating the voltage or current output of a system, selectively, and for setting the regulated value selectively to any one of a wide range of values.

The present invention constitutes an improvement in the automatic current and voltage regulator disclosed and claimed in Bruck Patent No. 2,708,734, assigned to the same assignee as the present application. The Bruck patent provides a current or voltage regulator wherein a source of reference voltage is applied through a preregulator to a voltage control device and a voltage divider, connected in series. A portion of the voltage developed across the voltage divider is applied to a chopper comparator, wherein it is compared with the voltage developed by a standard cell. The chopper produces an A. C. voltage, the amplitude and phase of which varies in accordance with the relative values of the standard cell voltage and the voltage taken from the voltage divider. This A. C. voltage is applied through an A. C. amplifier to a synchronous rectifier which develops a D. C. voltage, the sense and magnitude of which is determined by the phase and magnitude, respectively, of the A. C. voltage. The D. C. voltage is amplified in a D. C. amplifier, the output of the D. C. amplifier providing an error signal for controlling the impedance of the voltage control device to maintain its output constant. In this circuit, the standard cell is required to charge a storage capacitor and, upon initial energization of the system, a considerable current must be drawn from the standard cell and leakage of charge from the capacitor requires a constant supply of current from the cell in order to maintain the capacitor charge. As is well known, it is desirable in utilizing a standard cell, to minimize the current drain so as to prevent damage to the cell.

It is, therefore, an object of the present invention to provide a circuit for comparing a voltage derived from a voltage control device with the voltage generated by a standard cell, which circuit minimizes the current drain on the standard cell.

It is another object of the present invention to provide an apparatus for comparing a voltage from a voltage control device with the voltage of a standard cell by connecting the voltage sources in opposition, so that the current drain on the standard cell is determined by the difference between these two voltages, which difference is maintained quite small by the voltage control device.

Proceeding further with a description of the circuit of the Bruck patent, the output of the voltage control device is applied to a Varley voltage divider, which permits the selection of a wide range of output voltages. The output from the Varley voltage divider is utilized as a reference voltage and is compared in a comparator chopper with the output voltage of the system, when it is utilized as a regulated voltage source, to produce an A. C. error signal, the error signal being applied to a control circuit which functions to reduce the error signal. When the apparatus is utilized as a regulated current source the reference voltage supplied by the Varley divider is compared with a voltage proportional to the output current, this latter voltage being developed across a standard sampling resistor. The standard sampling resistor is connected in series with the current load and a control valve, the impedance of the control valve being varied by controlling its grid bias to maintain the load current constant. More specifically, the voltage developed across the sampling resistor is connected to the armature of the chopper and the reference voltage is connected to a first stationary contact of the chopper so that an A. C. signal is produced having a phase and magnitude determined by the relative magnitudes of the two voltages. The A. C. error signal, after suitable amplification, is applied to a second stationary contact of the chopper, whereby it is synchronously rectified to produce a D. C. error signal the sense and magnitude of which is determined by the phase and magnitude of the A. C. error signal. After suitable amplification the D. C. signal is applied to the control grid of the control valve, which functions to reduce the A. C. error signal. Synchronous rectification is accomplished between the second stationary contact and the armature of the chopper, and since the second contact is connected in the D. C. bias circuit of the control valve, the armature of the chopper must be connected to the cathode of the control valve so as to establish a voltage relationship between the grid and cathode of the control valve which varies only in accordance with the D. C. error signal. On the other hand, when the chopper is utilized to develop the A. C. error signal it must be connected to the standard resistor so that the voltage proportional to the output current can be compared with the reference voltage. Therefore, the armature must be connected to both the control valve cathode and to one end of the standard resistor. As a result, the cathode of the control valve and the aforesaid one end of the standard resistor must be connected together, and the current load must be placed in the plate circuit of the control valve. Placement of the current load in the plate circuit of the control valve complicated the apparatus since it is undesirable and, in fact, dangerous to have the current load terminals, which are utilized to selectively connect various current loads in the system, at a high potential with respect to the case of the apparatus. In order to avoid this difficulty, one of the output terminals for the current load is electrically connected to the case. But, since the terminal is connected in the plate circuit of the tube, it cannot be grounded, and therefore separate case and chassis grounds have to be provided. Consequently, the case and chassis have to be electrically insulated from one another, complicating fabrication of the apparatus. Further, the utilization of D. C. amplifiers introduces stability problems into the system, which are undesirable in a system designed to provide a very high degree of voltage or current regulation.

It is therefore another object of the present invention to provide a current regulating system employing a comparison system for comparing a standard voltage with a voltage indicative of the current output, wherein separate case and chassis grounds are not required.

Another object of the present invention is to provide a current or voltage regulating system wherein current loads may be connected in the cathode circuit of a control tube so that the difference in voltage between the current output terminals and the case is maintained quite small and therefore neither of the current output terminals need be connected to the case, thereby eliminating the necessity for separate chassis and case grounds.

Still another object of the present invention is to provide a current regulating device utilizing sampling resistors, connected in series with a current load in the cathode circuit of a current control valve, for generating a voltage proportional to current flow through the load, and utilizing a chopper for producing an A. C. error signal indicative of the difference between the proportional voltage and a voltage reference, wherein said A. C. error signal is rectified by a phase sensitive detector, and more particularly an electronic type phase detector, to produce a D. C. error signal for varying the bias on the control electrode of the control valve as to reduce the A. C. error signal.

The above and still further features, objects, and advantages of the invention will become apparent upon consideration of the following detailed description of a specific embodiment of the invention, especially when taken in conjunction with the accompanying drawings, wherein:

Figure 1 is a functional block diagram of a regulator in accordance with the invention.

Figure 4:
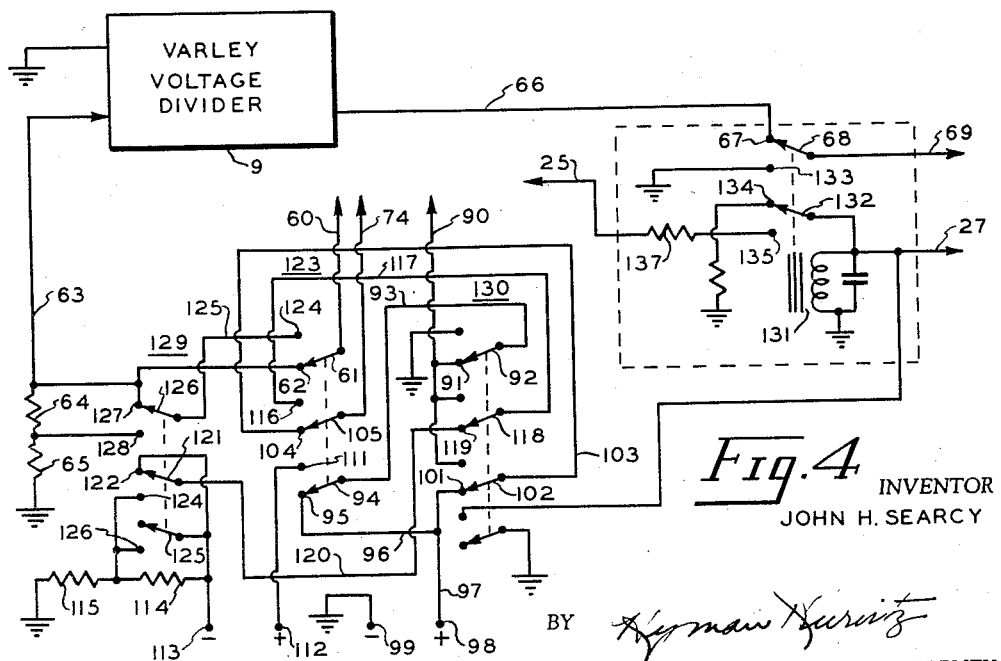
Figure 2:
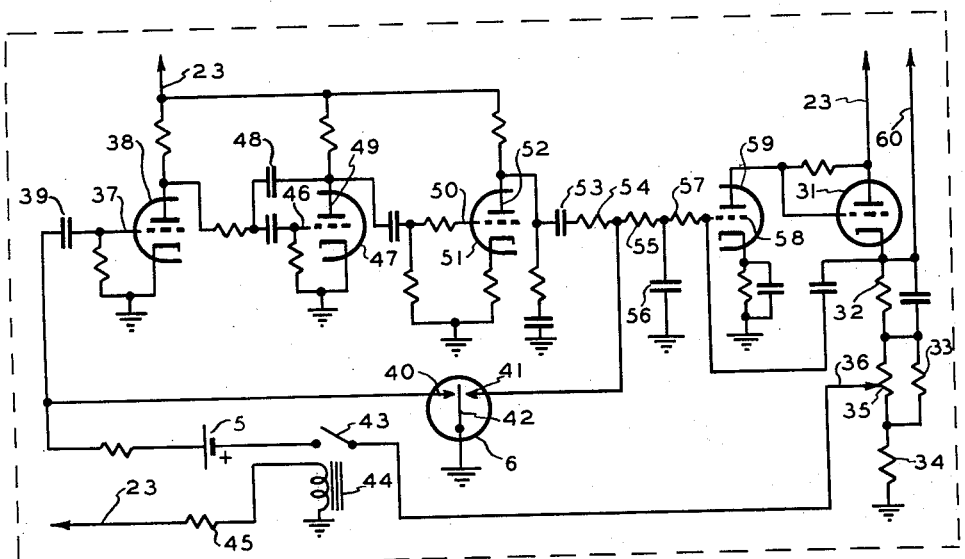
Figure 3:
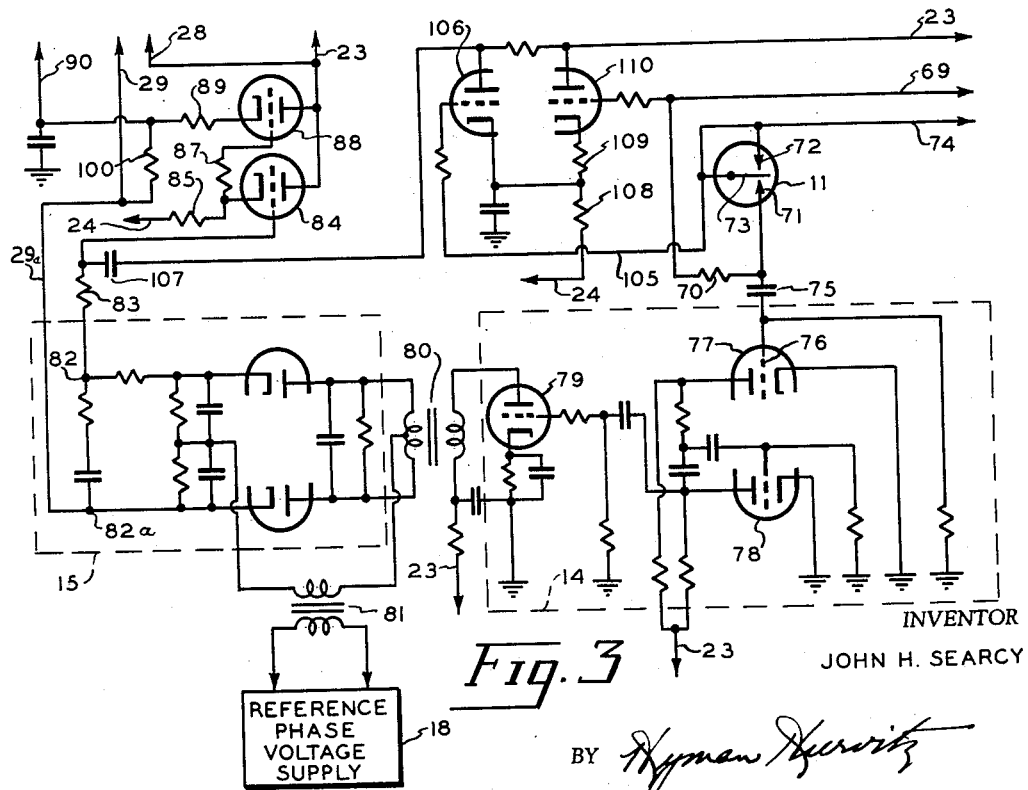

Figures 2–4 inclusive together are a schematic circuit diagram of a regulator in accordance with the invention.

Referring now more particularly to Figure 1 of the accompanying drawings, the reference numeral 1 denotes a power supply utilized to provide operating voltages for the various tubes in the circuit, and to provide a reference voltage for the system. The output of the power supply 1 is pre-regulated by a conventional pre-regulator 2, and the voltage output of the pre-regulator 2 is applied to a voltage control device 3 for accurate regulation of its voltage value. A fraction of the voltage supplied by the voltage control device 3 is taken from voltage divider 4 and applied in series with a standard cell 5 to an input of a chopper comparator 6. The chopper comparator 6, operated at 60 cycles per second, for example only, generates a square wave voltage having a phase and amplitude corresponding with the sense and amplitude of the difference between the voltage derived from the voltage divider 4 and the standard voltage derived from the standard cell 5.

The square wave voltage is amplified by a three stage A. C. amplifier 6a and is phase detected by a phase detector 7 to generate a rectified D. C. voltage having a sense and magnitude corresponding with the phase and magnitude of the square wave voltage. The D. C. voltage is amplified in D. C. amplifier 8 and applied as an error signal to voltage control device 3. This error signal controls the voltage output of the voltage control device 3 and maintains an accurate value of voltage output equal, in one specific example of the present invention, to 111.11 volts. This voltage may be denominated the "normalized" voltage and the elements 3, 4, 5, 6, 7 and 8 may be denominated the "normalizer." The normalized voltage is derived from a source of high power capability and is very accurately controlled due to the utilization of a standard cell in the normalizer circuitry. Since the normalized voltage is derived from a source of high power capability its magnitude may be much greater than that of the standard cell, thus permitting a far greater range of regulated values to be developed by this system than would be possible were the output of the standard cell 5 used directly for comparison with the output voltage of the voltage control device 3. To this point in the system, moreover, current drain is invariable, which renders possible more accurate regulation.

The normalized voltage available from the voltage control device 3 is applied to the input of a Varley-type voltage divider, 9, having four decades of 11,111 ohms maximum, in one example of the present system. The output of the voltage divider 9 may have any selected value from 0 to 109.99 volts by setting proper values in the several decades of the divider. The output of the divider 9 is then supplied to a calibrator 10 which compares the output of the voltage divider 9 with the final regulated voltage output of the system. More specifically, the output of the voltage divider 9 is applied to a comparator chopper 11 for comparison with a voltage available on a main output lead 12 when the system is employed as a voltage regulator, or a voltage available across a standard resistor 13 when the system is employed as a current regulator. The output voltage of the comparator chopper 11 is a square wave having the frequency of the chopper and a phase and amplitude dependent on the sense and magnitude of the deviation of the voltage on the lead 12, or across standard resistor 13, from that supplied by the voltage divider 9. The square wave output of the comparator chopper 11 is amplified by an A. C. amplifier 14 and applied to an electronic type phase detector 15, supplied with a reference phase voltage from a reference phase voltage supply 18, to provide a D. C. error voltage having a magnitude and sense dependent upon the phase and magnitude of the output voltage of the A. C. amplifier 14. The D. C. output voltage from the phase detector 15 is applied through a cathode follower 16 to a voltage control valve 17 supplied with plate voltage by the pre-regulator 2. The system may be utilized as either a regulated voltage supply or as a regulated current supply. When the system is utilized as a voltage regulator, a switch 19 is placed in the voltage position connecting the output lead 12 in series with the control valve 17. Switch 19 also couples the error signal input to the comparator chopper 11 to the output lead 12. The regulated output voltage across a load 20 connected in series with the output lead 12 is applied to the comparator chopper 11 where it is compared with the reference voltage supplied by the voltage divider 9. In response to a deviation in the output voltage from the reference voltage, the calibrator regulates the control valve so as to maintain the voltage on the output lead 12 constant.

When the system is utilized to maintain a constant current in a load such as 20' the switch 19 is placed in the milliampere position connecting the load 20' and standard resistor 13 in series with the control valve, and supplies a voltage, due to current flow through the standard resistor 13, to the input of the comparator chopper 11. Basically, a regulated current flow is caused to generate a voltage across standard resistor 13 and this voltage is controlled in order to regulate current. Therefore, the same general circuitry which serves to control voltage, also serves to control current and a relatively simple dual-function equipment is thereby provided.

The calibrator 10 has an inherent time lag which is sufficiently short to effect substantially instantaneous corrections in the output voltage, once a predetermined voltage or current range has been chosen. However, when the voltage or current range is to be switched and the instantaneous change in output voltage is great, the time lag of the calibrator 10 is sufficiently long to introduce undesirable delays in obtaining the predetermined voltage or current output. In order to eliminate the time lag encountered when switching the voltage or current range, there is provided a follow-up amplifier 21 having its input connected directly to the output of the voltage divider decade 9. The output voltage of the follow-up amplifier 21 is fed through an A. C. feedback amplifier 22, directly to the cathode follower 16. The follow-up system, therefore, bypasses all the elements of the calibrator 10 except the cathode follower 16 and instantaneously provides a correction voltage to the control valve 17. In order to eliminate A. C. ripple voltage which may feed through the system from the chopper 11 the A. C. amplifier 22 has its input connected to the error signal lead of the comparator chopper 11, the output of the A. C. feedback amplifier 22 being connected as previously indicated to the cathode follower 16. Thus, any A. C. voltage superposed on the output voltage or current is fed back in degenerative sense to the cathode follower, to eliminate the A. C. voltage.

The various operating and control voltages for the system are derived from power source 1 by means of rectifiers driven by A. C. sources, not generally illustrated, except that the power supply 1 is illustrated in Figure 1 of the accompanying drawings. The functions of the various voltages will appear as the description proceeds, it being sufficient to state at this point that certain power leads are shown, which supply the following voltages, specified for example only:

23—250 volt pre-regulated D. C. from source 1
24——150 volts pre-regulated from source 1
25——32 volts unregulated from source 1
26——24 volts unregulated from source 1
27—ground return for 250 volt supply
28 and 29—ungrounded regulated constant current D. C. voltage Referring now more particularly to Figures 2–4 of the accompanying drawings, the lead 23 is connected to the plate of a regulator valve 31, having its cathode connected in series with a cathode load comprising resistors 32, 33 and 34, to ground. A voltage divider 35 is connected across resistance 33, and a variable tap, 36, thereof, connects a fraction of the D. C. voltage on line 23 in series with the voltage of the standard cell 5 to a grid 37 of triode 38 through an A. C. coupling capacitor 39. The series connected tap 36 and standard cell 5 are also connected to one stationary contact 40 of the comparator chopper 6, having, in addition, a second stationary contact 41, and a vibrating armature 42 connected to ground. A switch 43, controlled by a relay 44, is connected in series between the tap 36 and the standard cell 5. The relay 44 is connected in series with a voltage limiting resistor 45 between ground and the lead 23 which supplies 250 volts D. C. When the system is de-energized the switch 43 is opened and opens the circuit between the tap 36 and the standard cell 5, thereby insuring that the standard cell 5 is not drained due to leakage through the system when the system is not in operation. When the system is energized and 250 volts appears on the lead 23, the relay 44 is energized, closing the switch 43 and connecting the standard cell 5 into the circuit.

The output voltage of the triode 38 is coupled to a grid 46 of a triode 47, degenerative feedback voltage being supplied to the grid 46 through a feedback capacitor 48 connected between plate 49 and grid 46. The output voltage of the triode 47 is applied to the control grid 50 of a third stage of A. C. amplification provided by triode 51. The plate 52 of the tube 51 is connected to ground through a series connection comprising coupling capacitor 53, resistors 54 and 55 and capacitor 56, the capacitor 56 having one terminal connected to ground, and the other terminal connected to the resistor 55. The junction of the capacitor 56 and resistor 55 is connected through a resistor 57 to a grid 58 of a triode 59 employed as a D. C. amplifier and the junction of the resistors 54 and 55 is connected to the stationary contact 41 of the chopper 6. The output voltage derived from the plate of the vacuum tube 59 is applied directly to the control grid of the voltage control tube 31.

When the arm 42 of the chopper 6 is not in contact with the stationary contact 40, a voltage is applied to the grid 37 of the triode 38 which is equal in magnitude to the difference between the voltage of the standard source 5 and the voltage derived from the resistor 35 by the tap 36, the sense of this voltage depending upon which of these two voltages is the larger. When the armature 42 contacts the stationary contact 40 of the chopper 6, the grid 37 of the triode 38 is effectively grounded and no signal is applied to the input of the tube. Therefore, a square wave voltage is applied to the grid 37, the phase and magnitude of which varies in accordance with the sense and magnitude of the voltage difference between the standard cell 5 and the voltage taken from the resistor 35. The voltage at the grid 37 is amplified by the cascaded triodes 38, 47 and 51, and the voltage appearing at the plate 52 of the triode 51 is rectified as a result of intermittent contact between the armature 42 and stationary contact 41 of the chopper 6, the resistor 55 and capacitor 56, providing a filter circuit for the rectified A. C. voltage and the D. C. voltage derived across the filter capacitor 56, is applied to the grid 58 of the D. C. amplifier tube 59. The triode 59 constitutes a control device for the regulator tube 31, since any variation in the bias of the control grid of the triode 59 results in a variation of potential at its anode of opposite sense and this variation is reflected as a variation of the internal impedance of the triode 31, and hence of the voltage available at the cathode of the triode 31. The normalized voltage of 111.11 volts is available at a lead 60 connected to this cathode.

Rectification of the output voltage of triode 51 is accomplished because the positive half-cycles of the square waves, in an example wherein the voltage of the tap 36 exceeds that of the standard cell 5, are by-passed to ground when the armature 42 contacts the stationary contact 41. Thus, there is provided in alteration and in synchronism with the square wave, a low impedance path for the square wave. The polarity of the D. C. voltage made available at the contact 41 is the same as the sign of the voltage difference between the voltage of tap 36 and the voltage of the standard cell 5. Continuing the example, the grid bias of the triode 59 is decreased, thereby lowering its plate voltage, which increases the internal impedance of the triode 31, and hence, reduces the voltage at the tap 36. The tendency of this system is, therefore, to equalize the values of the voltage at tap 36 and of the standard cell 5.

The connection of the standard cell 5 in series with the tap 36 provides advantages over systems such as disclosed in the aforesaid Bruck patent, for comparing the voltage at the tap 36 with a voltage developed across a storage capacitor by a standard cell. In such a system when the apparatus is initially energized the standard cell must supply sufficient current to charge the storage capacitor, and thereafter must supply sufficient current to maintain the capacitor charged. As is well known, it is desirable to minimize the current drain on a standard cell. The arrangement of the present application insures that the voltage drain on the standard cell is minimum at all times. Since the voltage of the standard cell is applied in opposition to the voltage appearing at the tap 36, current drain on the cell can occur only during those intervals in which the voltage of the standard source is greater than the voltage at the tap 36. As a result of the sensitivity of the feedback loop, the voltage difference between these two voltages is maintained quite small, and therefore even during those intervals when the voltage of voltage source 5 is greater than the voltage at the tap 36, the voltage differential is small and of short duration and the current drain is minimal. The feedback loop comprising the triodes 38, 47, 51 and 59 provides high closed loop gain which maintain errors introduced by heater current variations and line fluctuations to a minimum and the feedback in the stage of the tube 47 provided by the capacitor 48 insures high stability in the feedback loop.

The normalized voltage appearing on the lead 60 (see Figure 4) is delivered to a movable switch contact 61 and thence to contact 62 and via lead 63 to the input of the Varley voltage divider 9. The contact 62 is connected to a point of reference potential, for example, ground, through the series connected resistors 64 and 65. The details of the Varley voltage divider 9 are not discussed since the characteristics of this divider which make it applicable to the present circuit are discussed in detail in the aforementioned Bruck patent. It is sufficient to say that it is a known property of this type of voltage divider that it possesses the same input resistance for all possible settings of the divider. Therefore, the voltage divider 9 maintains a constant load across the output of the normalizer circuit, and as a result, variations of output voltage derived from the Varley voltage regulator 9 do not affect the normalized voltage and the exceedingly accurate regulation thereof is readily feasible. The voltage appearing on output lead 66 of the Varley voltage divider 9 is equal to the desired voltage output of the system and is used for comparison with the output voltage of the system, as will be described hereinafter. The lead 66 is connected to contact 67 and thence through movable contact 68, lead 69 and limiting resistor 70 to a stationary contact 71 of comparator chopper 11, the latter having a further stationary contact 72 and a vibratable armature 73. As will appear, as the description proceeds, the final controlled output voltage appears on lead 74 which is connected to both the armature 73 and stationary contact 72 of the chopper 11. The stationary contact 71 of the chopper 11 is connected through a coupling capacitor 75 to control grid 76 of a triode 77. There is developed at the control grid 76 an A. C. error voltage having a phase and magnitude dependent upon the sense and degree of deviation of the output voltage at the lead 75 from the reference voltage on the lead 69 derived from the Varley voltage divider 9. The A. C. voltage on the grid 76 results from the alternate switching of the grid circuit to the voltage of the lead 66 when the armature 73 is not engaging contact 71, and to the voltage of the lead 74 when the armature 73 engages the contact 71. If the voltages on the leads 69 and 74 are equal, the grid 76 assumes a fixed charge and no A. C. is developed. The square wave voltage appearing on the grid 76 when the aforesaid voltages are not equal, is amplified by a three state cascaded A. C. amplifier comprising triodes 77, 78 and 79. The output voltage from the triode 79 is coupled through a transformer 80 to one input of electronic type phase sensitive detector 15. A reference phase voltage synchronized with the driving voltage for the chopper 11 is derived from the reference phase voltage supply 18 and coupled through a transformer 81 to a second input of the phase-sensitive detector 15. The phase-sensitive detector 15 develops across its output terminals 82 and 82a a D. C. voltage, the magnitude and sense of which varies in accordance with the magnitude and phase of the A. C. voltage applied thereto through the transformer 80. The output voltage appearing at the terminals 82 and 82a is applied via a resistor 83 to the control grid of a triode 84 operated as a cathode follower. The plate of the triode 84 is directly connected to the lead 23 and the cathode is connected through a cathode load resistor 85 to the lead 24 which supplies −150 volts. The cathode of the triode 84 is connected through a resistor 87 to the control electrode of a triode 88, which constitutes the control valve 17 illustrated in Figure 1. The plate of the triode 88 is connected to the lead 23 and the cathode is connected through limiting resistor 89 and thence over lead 90, stationary contact 91, movable contact 92 to lead 93 and over movable contact 94, stationary contact 95 and leads 96 and 97 to a positive voltage terminal 98 to which one end of the voltage load 20 is connected. The other end of the voltage load 20, as illustrated in Figure 1, is connected to a negative voltage terminal 99 which is grounded. The anode of the triode 88 is connected to a lead 28 and the cathode is connected to a lead 29 through the resistor 89 and a resistor 100 connected in series therewith. The leads 28 and 29 supply a constant current serving to establish an operating point for the triode 88 by causing a value of current to flow from anode to cathode supplementary to that supplied by the main power source and derived from the pre-regulator 2, without tying any electrode of the triode 88 to any specific reference point but establishing a minimum current flow between anode and cathode for all total values of output current and voltage. The output terminal 82a of phase detector 15 is connected over lead 29a to the lead 29 thereby establishing a bias potential on the control grid of triode 84 which is varied in accordance with the output of the phase detector 15.

The triode 88 is connected in series between the voltage output of the pre-regulator 2 and the load when operating to regulate voltage, the load being in its cathode circuit. The control of the bias of the triode 88 by the cathode follower 84 varies its internal impedance and thereby varies the current flowing to the load and hence the voltage across the load. The system permits that current to flow which is required by the load to develop a voltage thereacross equal to that established by the Varley voltage divider 9. Essentially, the cathode of the triode 88 is connected directly with the output terminal 98. It is also connected via stationary contact 101, movable contact 102, lead 103, and thence through stationary contact 104, and movable contact 105 to the lead 74, connected to the stationary contact 72 and armature 73 of the chopper 11. This connection establishes a feedback loop which controls the grid potential of the triode 88, and therefore serves to maintain the output voltage constant.

The lead 74 is also connected over a lead 105 to the control grid of a triode 106. The triode 106 is plate loaded, the plate being connected through a coupling capacitor 107 to the control grid of the cathode follower 84 and provides an A. C. feedback loop serving to eliminate A. C. or transient variations of voltage at the terminal 98 resulting from the operation of the chopper 11. The cathode of the triode 106 is returned to a source of minus 150 volts on the lead 27 through a cathode resistor 108 connected in series with a resistor 109 in the cathode circuit of a follow-up triode 110. The plate of the triode 110 is directly connected to lead 23 and its control grid is connected to the output voltage of the Varley voltage divider 9 over the lead 69. It will be noted that the triode 110 is effectively connected in parallel with the triode 77 except that the latter is supplied with an error signal, while the control grid of the triode 101 is supplied directly with reference voltage from the Varley voltage divider 9. It is assumed that the present system, absent the triode 110, is relatively sluggish in its response to large changes in the output of the Varley voltage divider to effect changes in the output voltage appearing at the terminal 98. Switching from one required voltage output level to another different voltage level results in an extremely high wave voltage variation at chopper 11, with consequent saturation of the A. C. amplifier 14 resulting in sluggish response of the system. The triode 110 eliminates this delay by varying the cathode bias of the triode 106 in accordance with the voltage level requested by the Varley divider 9. Assuming for the purposes of illustrations the output voltage is to be increased, the grid voltage of triode 110 is increased, the increase in voltage being amplified by triode 106 and applied to the control grid of the tube 84. Increasing the voltage on the control grid of the tube 84 decreases the bias on the triode 88, reducing its internal impedance and thereby increasing the voltage appearing at the terminal 98. The triode 110, therefore, effectively bypasses the comparator 10 and decreases the response time of the system upon a change in the output voltage of the Varley voltage divider. It will be noted that the triode 106 serves both as an A. C. feedback amplifier for eliminating A. C. voltage at the voltage output and serves also as a follow-up amplifier for controlling the tube 84 in accordance with changes of output voltage from the Varley voltage divider.

Proceeding now to a description of the current regulating system, the lead 90, connected in the cathode circuit of the control valve 88, is connected through stationary contact 91, movable contact 92, lead 93, movable contact 94, stationary contact 111 to a positive current terminal 112. A negative current terminal 113 is connected through series connected current sampling resistors 114 and 115 to a source of reference potential which, for purposes of illustration only, is shown as ground. The reference voltage signal lead 74 is connected via movable contact 105, fixed contact 116, lead 117, movable contact 118, stationary contact 119, and thence over lead 120, through movable contact 121 and stationary contact 122 to the negative current terminal 113. Thus the load 20' is connected between the cathode of the control triode 88 and current sampling resistors 114 and 115. Voltage is taken across the latter for comparison with the reference voltage supplied from the Varley voltage divider 9 and by maintaining the voltage across the current sampling resistance 114 and 115 equal to the voltage output of divider 9, the current in the load is controlled or maintained at a corresponding or proportionate value. The lead 60 which carries the normalized voltage is connected through movable contact 61, stationary contact 124, lead 125, movable contact 126, stationary contact 127 to the lead 63 connected to the input of the Varley voltage divider 9. A switch 123 which comprises contacts 61, 62, 124, 104, 105, 116, 94, 95 and 111 is a selector switch for adapting the system to voltage or current regulation. When utilizing the system as a current regulator, the switch is in the up position, which is the reverse of the position illustrated in Figure 4. A second ganged switch 129 comprises contacts 126, 127, 128, 121, 122, 124 and 125. The switch 129 is ganged with the tens decade of the Varley voltage divider 9 and moves to the down position when the decade selector of the Varley divider 9 is positioned above a point which selects an output current of more than 9.999 milliamps. The switch 129, then, constitutes a range selector switch having two distinct functions. First, the contacts 126 through 128 change the range of the input voltage applied to the Varley voltage divider by selectively inserting in or removing from the decades input circuit the voltage dropping resistor 64. Second, the contacts 124 through 126 provide a range selector for the current sampling resistors. Thus when the switch 129 is moved to the down position, the current sampling resistor 114 is shorted by the switch contacts 125 and 126 and the output current flows only through the resistor 115. Also, the lead 120, which is connected through various contacts of on-off switch 130 to the lead 74, is connected to the junction between the resistors 114 and 115 by means of contacts 122 and 124 samples only the voltage across the resistor 115. As a result of the change of the input voltage to the Varley voltage divider and the change in the value of the current sampling resistors, a very large change in the range of the output current or voltage is permitted.

Proceeding now to the operation of the current control system, current passed by the triode 88 flows through the series connected load 20', disposed between current terminals 112 and 113 and sampling resistors 114 and 115 or simply resistor 115, depending upon the range of output currents selected. The voltage developed across the sampling resistors or resistor is proportional to the output current and is applied over lead 74 to the contact 72 and armature 73 of chopper 11. The chopper 11 compares the voltage across the sampling resistor 115 or resistors 114 and 115 with the output voltage of the divider 9 and the comparator 10 adjusts the bias on triode 88 to vary the internal impedance of triode 88 thereby regulating the current flow therethrough.

The utilization of the electronic type phase sensitive detector in the system of the present invention provides a considerable improvement in the operation and design of the system of the present invention over that provided by the aforementioned Bruck patent.

In the system of the Bruck patent, the D. C. voltage for controlling the control valve corresponding to valve 17 of the present invention is developed by a chopper corresponding to chopper 11. The chopper of the Bruck system is utilized both for producing the A. C. error signal and for synchronously rectifying the amplified A. C. error signal. As a result of this dual function, the voltage applied to the armature of the chopper must serve as both a voltage for comparison with the reference voltage and as a voltage having a fixed potential with respect to the cathode of the control valve. This latter requirement must be met since in the Bruck system the rectified error signal is applied through a D. C. amplifier directly to the grid of the control valve and if constant current is to be supplied to a variable load, the synchronous rectifier must maintain a predetermined D. C. relationship between the grid and cathode of the control valve which varies only in accordance with load current but does not vary with changes in the load. If the current load were placed in the cathode circuit of the control valve, variation in the load would change the D. C. voltage relationship between the control valve cathode and grid with changes in load making current regulation impossible. Therefore, in the Bruck patent the current load must be placed in the plate circuit of the control valve. The placement of the current load in the plate circuit of the control valve necessitated the provision of a separate chassis and case ground. Since it is not desirable to have a large potential differential between the output terminals of the current system and the case of the equipment, one of the output terminals was connected to case ground to eliminate such a possibility. However, since the current load was in the plate circuit of the control valve, the case ground could not be connected to chassis ground and this appreciably complicated the system, provisions having to be made for electrically isolating the case from the chassis. In the present invention, the utilization of an electronic type phase sensitive detector eliminates the necessity of employing the chopper 11 as a synchronous rectifier and the voltage on the armature 73 of the chopper 11 need not have a fixed potential with respect to the cathode of the control valve 17. As a result, the current load may be placed in the cathode circuit of the control valve rather than in the plate circuit and the necessity of providing a case ground insulated from the chassis ground is eliminated. More specifically, with the current load in the cathode circuit, the voltage difference between the current terminals and ground is sufficiently small not to necessitate maintenance of one of the terminals at the same voltage as the case. The improved operation provided by use of the phase detector 15 may be readily observed by a reference to the switching system of Figure 3. When the device is operated as a voltage regulator, the lead 74, which senses output voltage, is connected directly to the lead 90 in the cathode circuit of the control valve 88. When the system is utilized as a current regulating system, the lead 74 is switched so that it is connected to one end of the current sampling resistor 14, or when range is changed, to the high voltage end of the current sampling resistor 115. Since the lead 74 serves only to supply the output voltage to the comparator 10, the switching of the lead 74 does not in any way disturb D. C. biases in the circuits for controlling the bias on the control electrode of the triode 88. In addition to the elimination of a separate chassis and case ground, the present system provides other advantages over the system of the aforementioned Bruck patent. Grid leak current in the control valve 88 flows through both the external load and the current sampling resistors, and errors due to grid currents are eliminated. Further leakage currents in the supply of the auxiliary constant current appearing on leads 28 and 29 flow through both the current load and sampling resistors and eliminates errors previously encountered. In addition, the present system allows the elimination of D. C. amplifiers and the stability problems usually encountered in their operation. The phase sensitive detector drives a cathode follower amplifier 84 which has none of these stability problems.

Also the low impedance output circuit of the cathode follower makes the circuit independent of large amounts of grid current in the control valve 88.

The triode 88, which is illustrated as a single tube in the accompanying drawings, constitutes a plurality of high current tubes connected in parallel in order to supply the necessary current. Compensation for irregularities in gm in the various sections of the tubes is provided by placing separate cathode bias resistors 89 in each section, thereby decreasing the tendency of one section to carry more than its share of the load.

Overload protection for the apparatus is provided by a relay 131 for controlling movable switch contacts 68 and 132 which cooperate with stationary contacts 67, 133, 134 and 135, respectively. The coil of the relay 131 is connected in series with ground return lead 27 of power supply 1. When current in lead 27 becomes excessive the relay 131 is energized, disconnecting contact 68 from contact 67 and causing it to engage contact 133. This disconnects the output of Varley divider 9 from lead 69, and connects lead 69 to ground thereby causing the output voltage to assume ground potential which corresponds to zero output voltage. Energization of relay 131 further causes contact 132 to engage contact 135, which is connected through limiting resistor 137 to lead 25 which supplies −32 volts, and establishes a holding circuit for the relay.

While I have described and illustrated one specific example of the present invention, it will be clear that variation of the specific details of construction may be resorted to without departing from the true spirit of the invention as defined in the appended claims.

What I claim is:

1. In a current regulator, a source of electric power, a regulator tube, having a cathode and a control grid, connected in series with said source of current, a standard resistance connected in series between said cathode and a point of reference potential, means for connecting a current load between said cathode and said standard resistance, a source of regulated voltage, vibrating switch means for generating an A. C. error signal having a phase and magnitude determined by the relative magnitudes of said regulated voltage and the voltage developed across said standard resistance by flow of current therethrough, rectifying phase detector means for generating a D. C. error voltage having a sense and magnitude determined by the phase and magnitude of said A. C. error voltage and means for applying said D. C. error voltage to said control grid of said regulator device to reduce said A. C. error voltage.

2. The combination in accordance with claim 1 including means for deriving said regulated voltage which comprises a voltage responsive variable impedance in series with said source of electric power, a voltage divider connected between said variable impedance and a point of reference potential, a source of standard voltage, a lead, means for developing on said lead a differential voltage having a sense and magnitude determined by the relative magnitudes of said voltages, said means comprising means for connecting said standard source and a portion of said regulated voltage in series opposition and means responsive to said differential voltage for controlling said variable impedance so as to reduce said differential voltage, a multiple decade constant resistance load connected in parallel with said voltage divider, said constant resistance load having output terminals at which are available said regulated current.

3. In a current regulator having a source of current, a regulator tube having an anode, a cathode and at least one control grid, means connecting said anode in series with said source, a standard impedance connected in series with said cathode and means for connecting a current load between said cathode and said standard impedance, a source of reference voltage, comparator means for generating a D. C. voltage having a polarity and magnitude determined by the relative magnitudes of the reference voltage and the voltage across said standard impedance, a circuit interconnecting said grid and said cathode of said tube and means for injecting said D. C. voltage into said circuit in such a sense as to reduce said D. C. voltage to zero.

4. In a current and voltage regulator a source of electric power, a tube having an anode, a cathode and at least one control grid, means connecting said source and said anode in series, first means across which a voltage load may be connected, second means across which a current load may be connected, a standard impedance connected in series with said second means, switch means operable between a first and a second position, means for alternatively connecting said first means and said second means in series with said cathode upon said switch means obtaining said first position and said second position, respectively, a source of reference voltage, comparator means for producing a D. C. voltage having a sense and magnitude determined by the relative magnitudes of the reference voltage and the voltage across the voltage load when said switch is in the first position, and for producing a D. C. voltage having a sense and magnitude determined by the relative magnitudes of the reference voltage and the voltage across said standard impedance when said switch means are in said second position, a circuit interconnecting said cathode and said grid and means for injecting said D. C. voltage into said circuit in such a sense as to reduce said D. C. voltage to zero.

5. The combination in accordance with claim 4, wherein said comparator means comprises means for producing an A. C. voltage having a phase and magnitude determined by the relative magnitudes of the reference voltage and one of the other of said voltages and electronic phase comparison means for producing a D. C. voltage having a sense and magnitude determined by the phase and magnitude of the A. C. voltage.

6. In a current regulator having a source of current, a regulator tube having an anode, a cathode and at least one control grid, means connecting said anode in series with said source, a standard impedance connected in series with said cathode and means for connecting a current load between said cathode and said standard impedance, a source of reference voltage, comparator means for generating an A. C. voltage having a phase and magnitude determined by the relative magnitudes of said reference voltage and the voltage across said standard impedance, phase detector means for generating a D. C. voltage having a sense and magnitude determined by the phase and magnitude of said A. C. voltage, a circuit interconnecting said grid and said cathode of said tube and means for injecting said D. C. voltage into said circuit in such a sense as to reduce said D. C. voltage to zero.

7. In combination, a source of standard voltage means for deriving a controlled voltage of fixed amplitude by comparison of said controlled voltage with said standard voltage, a constant resistance load connected across said controlled voltage of fixed amplitude, means for deriving any one of a plurality of fixed voltages from said constant resistance load, a regulator tube having an anode, a cathode and at least one control grid, means connecting said anode to a source of electric power, a standard impedance connected in series with said cathode and means for connecting a current load between said cathode and said standard impedance, comparator means for generating a D. C. voltage having a polarity and magnitude determined by the relative magnitudes of the voltage across said standard impedance and said any one of a plurality of fixed voltages, a circuit interconnecting said grid and said cathode of said tube and means for injecting said D. C. voltage into said circuit in such a sense as to reduce said D. C. voltage to zero.

8. The combination in accordance with claim 7, wherein said comparator means comprises a vibratory means having at least one stationary contact and a movable contact alternately deflectable into and out of engagement with said stationary contact, an A. C. amplifier having an input circuit, means connecting said stationary contact to said input circuit and to said means for driving any one of a plurality of fixed voltages and means connecting said movable contact to receive the voltage across said standard impedance.

9. The combination in accordance with claim 7, wherein said means for injecting comprises an electronic phase detector having an output circuit, a cathode follower amplifier having an input and output circuit, means connecting said output circuit of said phase detector between said cathode of said tube and the input circuit of said cathode follower amplifier and means connecting the output circuit of said cathode follower amplifier and said control grid of said tube.

10. The combination in accordance with claim 4, wherein said comparator means comprises a vibratory means having at least one stationary contact and a movable contact alternately deflectable into and out of engagement with said stationary contact an A. C. amplifier having an input circuit, means connecting said stationary contact to said input circuit and said source of reference voltage, means connecting said movable contact to receive the voltage across said standard impedance, and wherein said switch means comprises means for connecting said movable contact alternatively to said cathode of said tube and to said standard impedance when said switch means obtains said first position and said second position, respectively.

References Cited in the file of this patent

UNITED STATES PATENTS

| | | |
|---|---|---|
| 2,717,352 | Ribner | Sept. 6, 1955 |
| 2,728,858 | Ziffer | Dec. 27, 1955 |